(12) United States Patent
Hattori et al.

(10) Patent No.: US 7,141,183 B2
(45) Date of Patent: Nov. 28, 2006

(54) CONDUCTIVE ELASTOMER COMPOSITION AND METHOD OF PRODUCING SAME

(75) Inventors: Takayuki Hattori, Hyogo (JP); Tetsuo Mizoguchi, Hyogo (JP); Toshiaki Sakaki, Hyogo (JP); Hideyuki Okuyama, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 347 days.

(21) Appl. No.: 10/623,722

(22) Filed: Jul. 22, 2003

(65) Prior Publication Data

US 2004/0135129 A1    Jul. 15, 2004

(30) Foreign Application Priority Data

| Jul. 22, 2002 | (JP) | ............................. 2002-212530 |
| Jul. 22, 2002 | (JP) | ............................. 2002-212548 |
| Dec. 11, 2002 | (JP) | ............................. 2002-359489 |

(51) Int. Cl.
  *H01B 1/20*   (2006.01)
  *G03G 15/08*  (2006.01)

(52) U.S. Cl. ..................... 252/500; 524/500; 428/500; 399/279

(58) Field of Classification Search ................ 252/500; 524/500; 428/500; 399/107, 279
See application file for complete search history.

(56) References Cited

U.S. PATENT DOCUMENTS 5,965,206 A * 10/1999 Hilti et al. ................ 427/393.1

6,184,295 B1 * 2/2001 Okuyama .................... 525/192
6,217,961 B1    4/2001 Hert et al.
6,476,140 B1 * 11/2002 Hattori et al. .............. 525/191

FOREIGN PATENT DOCUMENTS

| EP | 0838487 A2 | 4/1998 |
| EP | 0885913 A1 | 12/1998 |
| JP | 8-34929 A | 2/1996 |
| JP | 8-183866 A | 7/1996 |
| JP | 2001109233 A | 4/2001 |
| WO | WO 99/33918 A1 | 7/1999 |

OTHER PUBLICATIONS

Geoffrey Holden: "Encyclopedia of Polymer Science and Technology vol. 6" [Online] Jul. 15, 2002, John Wiley & Sons Retrieved from the Internet: URL:http://www.mrw.interscience.wiley.com/epst/articles/pst105/sect3-fs.html>.

* cited by examiner

*Primary Examiner*—Mark Kopec
(74) *Attorney, Agent, or Firm*—Birch, Stewart, Kolasch & Birch, LLP

(57) ABSTRACT

A conductive elastomer composition having rubber-like elasticity and flexibility and thermoplastic-resin-like moldability and realizing a high conductivity. The conductive elastomer composition includes a thermoplastic elastomer composition (A) containing a compound (A1) composed of a thermoplastic resin and/or a thermoplastic elastomer and a compound (A2), composed of a crosslinkable rubber and/or a crosslinkable thermoplastic elastomer, dispersed in the compound (A1) by dynamically crosslinking the compound (A2); and an ionic-conductive agent (B), containing a metal salt and a polyether-containing block copolymer resin, dispersed in the thermoplastic elastomer composition (A). The conductive elastomer composition may contain carbon black (C).

18 Claims, 3 Drawing Sheets

CONDUCTIVE ELASTOMER COMPOSITION AND METHOD OF PRODUCING SAME

BACKGROUND OF THE INVENTION

1. Field of the Invention

The present invention relates to a conductive elastomer composition, a method of producing it, and conductive members composed of the conductive elastomer composition. More particularly, the conductive elastomer composition is used suitably for conductive members such as conductive belts including a transfer belt and conductive rollers including a transfer roller, a driving roller, a developing roller, and a charging roller for a copying machine, a printer, and the like. The present invention is intended to allow the conductive elastomer composition to have rubber-like durability, elasticity, and flexibility, resin-like moldability, and a low electric resistance by improving an ionic-conductive agent to be contained in the conductive elastomer composition.

2. Description of the Related Art

It is necessary that conductive members such as conductive belts including a transfer belt and conductive rollers including a transfer roller, a driving roller, a developing roller, and a charging roller for a copying machine, a printer, and the like have an appropriate stable electric resistance value.

As a method of imparting electric conductivity to the conductive member of this kind, the following two methods are known: In one of them, an electroconductive polymer composition containing a conductive filler such as powder of metal oxide or carbon black is used; and in the other method, an ionic-conductive polymer such as urethane rubber, acrylonitrile-butadiene rubber (NBR), and epichlorohidrin rubber is used.

In the case where the electroconductive polymer composition is used, there is a region in which an electric resistance changes rapidly owing to a slight change of an addition amount of a conductive filler. Thus it is very difficult to control the electric resistance. In addition, because it is difficult to disperse the conductive filler uniformly in the polymer composition, an electric resistance value has variations in the circumferential and widthwise directions of the conductive roller. Further because the electric resistance value of the conductive roller depends on an applied voltage, the conductive roller does not have a constant electric resistance value.

Thus as the recent tendency, a conductive member composed of the ionic-conductive polymer is used rather than a roller composed of the electroconductive polymer in a copying machine and a printer required to form a high-image quality by using digital image processing technique and color image processing technique and save energy. Various ionic-conductive polymers have been proposed.

For example, in Japanese Patent Application Laid-Open No.8-34929, to enhance ionic conductivity and mechanical strength of the ionic-conductive polymer, there is disclosed the polymeric solid electrolyte. The low-polarity polymeric phase of the polymeric solid electrolyte has a crosslinking structure. The polymeric component of the low-polarity polymeric phase has double bonds. A part of the double bonds cleaves to form an intramolecular or intermolecular crosslinking.

In Japanese Patent Application Laid-Open No.8-183866, there is disclosed a sheet composed of the thermoplastic elastomer containing the olefin thermoplastic elastomer used as its main component and the permanent antistatic agent and a method of producing the sheet composed of the thermoplastic elastomer. The sheet is developed to be recycled and to prevent electrical troubles from occurring.

However, the polymeric solid electrolyte disclosed in Japanese Patent Application Laid-Open No.8-34929 has problems that the material cost and the producing cost are high, and both a low compression strain and thermoplasticity cannot be realized.

In the sheet disclosed in Japanese Patent Application Laid-Open No.8-183866, the permanent antistatic agent is contained in the olefin thermoplastic elastomer not to reduce the volume resistivity of the sheet but to lower the surface resistance value to thereby realize antistatic performance. Thus the sheet has a high electric resistance. On the basis of the fundamental components (ultraviolet ray-absorbing agent, HALS, and colorant not affecting compression set and conductivity are not used) of the example 3 shown in table 1, a conductive specimen of the comparison example 4 shown in table 2 has been formed as an experiment. The result was that the specimen had a large compression set and did not have a preferable property value. An antistatic agent containing an electrically conductive plasticizer is conceivable. However, such an antistatic agent damages mechanical property of the sheet composed of the thermoplastic elastomer, deteriorates the compression set thereof, and stains a photosensitive member. Thus the sheet disclosed in Japanese Patent Application Laid-Open No.8-183866 cannot be used for the conductive member for a copying machine and the like.

The ionic-conductive polymer practically used for the conductive member is composed mainly of a vulcanized rubber composition which cannot be recycled. It is conceivable to use not the vulcanized rubber composition but a chlorine-containing thermoplastic elastomer. However, the chlorine-containing thermoplastic elastomer has a large compression set and stains the photosensitive member. Further there is a fear that the chlorine-containing thermoplastic elastomer generates a harmful gas such as hydrogen chloride and dioxine when it burns. People are now very conscious of environmental problems. Thus the chlorine-containing thermoplastic elastomer has a problem in handling it when it is discarded.

SUMMARY OF THE INVENTION

The present invention has been made in view of the above-described problems. Therefore it is an object of the present invention to provide a conductive polymer composition having rubber-like elasticity and flexibility and preferable resin-like moldability and realizing a low electric resistance and being recyclable; a method of producing the conductive polymer composition; and a conductive member composed of the conductive elastomer composition.

To achieve the object, the present invention provides a conductive elastomer composition including a thermoplastic elastomer composition (A) containing a compound (A1) composed of a thermoplastic resin and/or a thermoplastic elastomer and a compound (A2), composed of a crosslinkable rubber and/or a crosslinkable thermoplastic elastomer, dispersed in the compound (A1) by dynamically crosslinking the compound (A2); and an ionic-conductive agent (B), containing a metal salt and a polyether-containing block copolymer resin, mixed with and dispersed in the thermoplastic elastomer composition (A).

The present inventors have found that it is possible to obtain a conductive elastomer composition having rubber-like durability, elasticity, and flexibility, resin-like moldability, and a low electric resistance by dynamically crosslinking and dispersing the compound (A2) in the compound (A1) and then dispersing the ionic-conductive agent (B) containing the polyether-containing block copolymer resin and the metal salt in the thermoplastic elastomer composition (A). Since the conductive elastomer composition of the present invention is thermoplastic, it is recyclable.

Since an ionic-conductive agent containing the metal salt and the polyether-containing block copolymer resin has the polyether structure, it is possible to stabilize ions of the metal salt or the like and reduce the electric resistance of the conductive elastomer composition effectively. Structures other than the polyether structure in the block copolymer resin allows the ionic-conductive agent to be compatible with the base material of the conductive polymer composition to a certain extent. Thus the conductive elastomer composition has preferable property and processability. The ionic-conductive agent containing the metal salt and the polyether-containing block copolymer resin has a much greater effect of reducing the electric resistance of the conductive elastomer composition than other kinds of antistatic agents and is capable of holding preferable property of the conductive elastomer composition serving as the base material of the conductive elastomer composition.

The polyether-containing block copolymer resin contained in the ionic-conductive agent consists of one or more resinous compositions selected from among a group of a polyether block amide copolymer resin, a modified substance of a polyether ester amide resin, and a polyether block polyolefin resin.

Because the polyether-containing block copolymer resin consists of the resinous composition, in molding the conductive elastomer composition into a conductive member by injection molding or extrusion molding after the conductive elastomer composition is kneaded, a structure (percolation structure) advantageous for energization is formed in the matrix resin such as the olefin resin to thereby reduce the electric resistance value of the conductive member to a higher extent than the conventional conductive member. In particular, when a mixture of the polyether block amide copolymer resin and a polyamide homopolymer and above all, when a mixture of the polyether block amide copolymer resin and the polyamide homopolymer having the same structure of the amide contained in the polyether block amide copolymer resin that has melted at a high temperature during molding are cooled to form a phase structure, the polyamide homopolymer are coagulated fibrously earlier than the polyether block amide copolymer resin. Thereafter the polyether block amide copolymer resin is effectively arranged in the polyamide homopolymer owing to the compatibility of the former with the latter to form the percolation structure favorably.

For example, the melting point of polyethylene oxide block nylon 12 resin contained in Irgastat P18 used in the example of the present invention is 158° C. The melting point of nylon 12 is 176° C. a little higher than that of the polyethylene oxide block nylon 12 resin. The melting point of polyethylene oxide block nylon 6 resin contained in Irgastat P22 is 204° C. The melting point of nylon 6 is 220° C. a little higher than that of the polyethylene oxide block nylon 6 resin. In each case, the melting point of the homopolymer is higher than that of the polyether block amide copolymer. Thus the homopolymer coagulates earlier than the polyether block amide copolymer.

As the metal of the metal salt, it is possible to use alkali metals, the group 2A metals, and in addition, other metals.

As the resinous composition, the polyether block amide copolymer resin is preferable. Above all, polyether block nylon resin is preferable. More specifically, polyether block nylon 11 resin, polyether block nylon 12 resin, and polyether block nylon 6 resin are optimum. Further as described above, a mixture of polyether block nylon 12 copolymer resin and nylon 12 and a mixture of polyether block nylon 6 copolymer resin and nylon 6 are particularly preferable because they are capable of effectively forming the percolation structure.

It is preferable that the conductive elastomer composition contains the ionic-conductive agent (B) at a volume fraction of not less than 8% nor more than 45%.

If the conductive elastomer composition contains the ionic-conductive agent (B) at a volume fraction less than 8%, it is difficult to reduce the electric resistance of the conductive elastomer composition. On the other hand, if the conductive elastomer composition contains the ionic-conductive agent (B) at a volume fraction more than 45%, the moldability and compression set of the conductive elastomer composition are liable to deteriorate, and the volume resistivity thereof hardly decreases. That is, the cost of the conductive elastomer composition becomes high owing to addition of use of an excess amount of the ionic-conductive agent.

The conductive elastomer composition contains the ionic-conductive agent (B) favorably at a volume fraction less than 10% nor more than 40%, more favorably at less than 15% nor more than 40%, and most favorably at less than 20% nor more than 40%. The volume fraction means a volume percentage of the ionic-conductive agent (B) in a resinous matrix phase of the conductive elastomer composition. The volume percentage of the ionic-conductive agent (B) in the resinous matrix phase is the ratio of the ionic-conductive agent (B) in the resinous matrix, excluding the rubber and the thermoplastic elastomer that are dynamically crosslinked to form a domain.

The thermoplastic elastomer composition (A) includes the compound (A1) containing a styrene thermoplastic elastomer and/or an olefin resin as a main component thereof; and the compound (A2), dispersed in the compound (A1) by dynamically crosslinking the compound (A2), consisting of one or more rubber components selected from among EPDM, butyl rubber, halogenated butyl rubber, acrylic rubber, BIMS which is a rubber formed by bromizing a copolymer of isobutylene and p-methylstyrene, fluororubber, and silicone rubber.

For example, the thermoplastic elastomer composition (A) has as its base a composition including the compound (A1) containing the styrene thermoplastic elastomer as its main component and the compound (A2), containing the EPDM as its main component, dispersed in the compound (A1) by dynamically crosslinking the compound (A2). Thereby the conductive elastomer composition is allowed to have a low hardness, a low compression set, and realizes rubber-like elasticity and flexibility and resin-like moldability.

It is preferable that the rubber component of the compound (A2) consists of the EPDM only. In the case where the EPDM is mixed with other rubber, the ratio of the EPDM to the entire rubber is favorably not less than 50 wt % and more favorably not less than 80 wt %. The main chain of the EPDM consists of saturated hydrocarbon and does not contain double bonds. Thus even though the EPDM is exposed to high-concentration ozone atmosphere or irradiated with light for a long time, the molecular main chain is hardly cut. Therefore the conductive elastomer composition has improved resistance to ozone, ultraviolet rays, and heat by increasing the mixing ratio of the EPDM which is highly resistant to ozone, ultraviolet rays, and heat to the ratio described above.

Other than the EPDM, diene rubber is preferably used as the rubber component of the compound (A2). For example, it is preferable to use chloroprene rubber (CR), natural rubber (NR), butadiene rubber (BR), styrene-butadiene rubber (SBR), isoprene rubber (IR), acrylonitrile-butadiene rubber (NBR), and hydrogenated nitrile rubber (HNBR) or a mixture of two or more of these rubbers. When the diene rubber is combined with the thermoplastic resin, it is possible to use a crosslinking agent that crosslinks the diene rubber but does not crosslink the thermoplastic resin. In addition, it is possible to use butyl rubber, ethylene propylene rubber, acrylic rubber, and chlorosulfonated polyethylene rubber.

As crosslinkable thermoplastic elastomers, it is possible to use a styrene-isoprene-styrene block copolymer (SIS), a styrene-butadiene-styrene block copolymer (SBS) or partly hydrogenated SIS and SBS.

It is favorable that the ratio of the sum of the weight of the styrene thermoplastic elastomer and the olefin resin of the compound (A1) to the weight of the rubber component, of the compound (A2), whose main component is EPDM is in the range of (40:60) to (15:85).

If the weight ratio of the rubber component is more than the upper limit, it is difficult to obtain preferable moldability of the obtained conductive elastomer composition. On the other hand, if the weight ratio of the rubber component is less than the lower limit, the compression set of the conductive elastomer composition is liable to deteriorate. It is more favorable that the weight ratio of the sum of the weight of the styrene thermoplastic elastomer and the olefin resin of the compound (A1) to the weight of the rubber component of the compound (A2) is in the range of (45:55) to (25:75).

The compound (A1) contains favorably not less than 15 parts by weight of a softener nor more than 500 parts by weight thereof for 100 parts by weight of the rubber component and more favorably not less than 25 parts by weight of the softener nor more than 400 parts by weight thereof. Thereby the thermoplastic elastomer composition is capable of obtaining a proper degree of flexibility and elasticity.

If the compound (A1) contains less than 15 parts by weight of the softener, the hardness of the thermoplastic elastomer composition is liable to be high. On the other hand, if the compound (A1) contains more than 500 parts by weight thereof, the softener is liable to bleed from the surface of the dynamically crosslinked substance or the softener shifts to the rubber, thus inhibiting crosslinking and deteriorating the property of the thermoplastic elastomer composition.

The compound (A1) contains favorably not less than one part by weight of a resin whose main component is the olefin resin nor more than 50 parts by weight thereof for 100 parts by weight of the rubber component, more favorably not less than two parts by weight thereof nor more than 40 parts by weight thereof, and most favorably not less than four parts by weight thereof nor more than 35 parts by weight thereof.

If the compound (A1) contains less than one part by weight of the resin, the amount of the resin is so small that the effect of improving processability cannot be confirmed clearly. On the other hand, if the compound (A1) contains more than 50 parts by weight of the resin, a conductive member such as a roller composed of the conductive elastomer composition is liable to have a very high hardness.

The compound (A2) contains favorably not less than 15 parts by weight of the softener nor more than 600 parts by weight thereof for 100 parts by weight of the rubber component and more favorably not less than 25 parts by weight of the softener nor more than 400 parts by weight thereof. Thereby the thermoplastic elastomer composition is capable of obtaining a proper degree of flexibility and elasticity.

If the compound (A2) contains less than 15 parts by weight of the softener, the hardness of the thermoplastic elastomer composition is liable to be high. On the other hand, if the compound (A1) contains more than 600 parts by weight thereof, the softener is liable to bleed from the surface of the dynamically crosslinked substance or the softener shifts to the rubber, thus inhibiting crosslinking, i.e., not crosslinking the rubber sufficiently and deteriorating the property of the thermoplastic elastomer composition.

The volume resistivity of the conductive elastomer composition is not more than $10^{11}$ ($\Omega \cdot cm$) when it is measured at an applied voltage of 1000V in a test method specified in JIS K6911. If the volume resistivity of the conductive elastomer composition is larger than $10^{11.0}$ ($\Omega \cdot cm$), the conductive member such as the roller and a belt composed of the conductive elastomer composition has a low efficiency in transfer, electric charge, and supply of toner. Thus the conductive member cannot be put into practical use. It is favorable that the conductive elastomer composition is semi-conductive, i.e., the volume resistivity thereof is not less than $10^{4.0}$ ($\Omega \cdot cm$) nor more than $10^{11.0}$ ($\Omega \cdot cm$). The measurement condition for the volume resistivity is specified in JIS K6911 at an applied voltage of 100V, a constant temperature of 23° C. and a constant relative humidity of 55%.

In the case where the conductive elastomer composition contains carbon black (C), the volume resistivity thereof can be set to less than $10^8$ ($\Omega \cdot cm$) when the volume resistivity is measured at an applied voltage of 1000V in a test method specified in JIS K6911.

As described above, the ionic-conductive agent (B) containing the metal salt and the polyether-containing block copolymer resin is dispersed in the matrix of the thermoplastic elastomer composition (A) and the carbon black is contained therein. Thus the conductive elastomer composition is allowed to have rubber-like durability, elasticity, flexibility, and thermoplastic resin-like moldability. In addition, it is possible to greatly increase the conductivity of the conductive elastomer composition by adding a very small amount of the carbon black thereto. When the thermoplastic elastomer composition contains a small amount of the carbon black, the compression set and flowability thereof hardly deteriorates and is hardly hardened. That is, it is possible to improve the conductivity of the conductive elastomer composition greatly not by increasing the use amount of the ionic-conductive agent, which is expensive but by using a small amount of the carbon black for the thermoplastic elastomer composition. Thereby the volume resistivity of the conductive elastomer composition can be set to not more than $10^8$ ($\Omega \cdot cm$) when it is measured at an applied voltage of 1000V.

In the case where the conductive elastomer composition contains the carbon black, it is favorable that not less than 5 wt % of the ionic-conductive agent (B) nor more than 45 wt % thereof is used for the whole weight of the conductive elastomer composition.

If less than 5 wt % of the ionic-conductive agent (B) is used for the whole weight of the conductive elastomer composition, it is difficult to obtain the effect of reducing the electric resistance thereof. If more than 45 wt % of the ionic-conductive agent (B) is used for the whole weight of the conductive elastomer composition, the conductive elastomer composition is liable to harden. Even though the conductive elastomer composition contains the costly ionic-conductive agent (B) at more than a certain amount, the conductivity thereof hardly changes, and the material cost becomes high. It is more favorable that not less than 10 wt % of the ionic-conductive agent (B) nor more than 30 wt % thereof is used for the whole weight of the conductive elastomer composition.

It is preferable that not less than 10 parts by weight of the ionic-conductive agent (B) nor more than 150 thereof is used for 100 parts by weight of compound (A1) which is the matrix component of the thermoplastic elastomer composition (A).

It is favorable that not less than 1.0 wt % of the carbon black nor more than 10.0 wt % thereof is used for the whole weight of the conductive elastomer composition.

If less than 1.0 wt % of the carbon black is used for the whole weight of the conductive elastomer composition, it is difficult to obtain the effect of reducing the electric resistance value thereof. On the other hand, if more than 10.0 wt % of the carbon black is used for the whole weight of the conductive elastomer composition, the conductive elastomer composition is apt to have problems in its property. For example, the conductive elastomer composition is apt to have a low flowability or a high hardness when it is molded and its compression set and processability are liable to deteriorate. It is more favorable that not less than 2 wt % of the carbon black nor more than 5 wt % thereof is used for the whole weight of the conductive elastomer composition.

It is favorable that not less than 2 wt % of the carbon black nor more than 25 wt % thereof is used for 100 parts by weight of the compound (A1) of the thermoplastic elastomer composition (A).

It is preferable that the conductive carbon black used as the carbon black (C). As the conductive carbon black, Ketjen black EC and Ketjen black EC-600JD can be used. In addition, acetylene black and the like can be used as the conductive carbon black. Denka black (produced by Denki Kagaku Kogyo) can be used as the acetylene black.

It is favorable that the thermoplastic elastomer composition (A) contains not less than 25 parts by weight of the styrene thermoplastic elastomer nor more than 400 parts by weight thereof, less than 500 parts by weight of the softener, and less than 50 parts by weight of the olefin resin for 100 parts by weight of the rubber component such as the EPDM.

If the thermoplastic elastomer composition (A) contains less than 25 parts by weight of the styrene thermoplastic elastomer, the thermoplastic elastomer composition (A) has a low flowability. Thus it is difficult to process the conductive elastomer composition containing the thermoplastic elastomer composition (A). Therefore when the compound (A2) is dispersed in the compound (A1) by dynamically crosslinking the compound (A2), the conductive elastomer composition becomes crumble and hence it is difficult to mold the conductive elastomer composition. On the other hand, if the thermoplastic elastomer composition contains (A) more than 400 parts by weight of the styrene thermoplastic elastomer, the compression set of the conductive elastomer composition is liable to be high. It is more favorable that the thermoplastic elastomer composition (A) contains not less than 30 parts by weight of the styrene thermoplastic elastomer nor more than 150 parts by weight thereof.

It is preferable that hydrogenated styrene thermoplastic elastomer is used as the styrene thermoplastic elastomer. Double bonds of the hydrogenated styrene thermoplastic elastomer are saturated by hydrogenation. The hydrogenated styrene thermoplastic elastomer has a low hardness and is durable. Since the double bonds of the hydrogenated styrene thermoplastic elastomer are saturated, the hydrogenated styrene thermoplastic elastomer does not react with a crosslinking agent in the dynamic crosslinking and thus does not inhibit crosslinking of the rubber. Thus the dynamically crosslinked thermoplastic elastomer composition is capable of exhibiting desired thermoplasticity. Accordingly it is preferable to use the styrene thermoplastic elastomer hydrogenated to such an extent that the styrene thermoplastic elastomer is not crosslinked in the dynamic crosslinking. It is preferable that the molecular weight of the styrene thermoplastic elastomer is not less than 80000 in terms of its mechanical strength. The resin and the rubber are crosslinked by using non-hydrogenated thermoplastic elastomer (SBS, SIS and the like) in a range in which the processability of the conductive elastomer composition does not deteriorate. Thereby the mechanical strength of the conductive elastomer composition can be increased.

The following hydrogenated styrene thermoplastic elastomers can be used: styrene-ethylene-ethylene/propylene-styrene copolymer (SEEPS), styrene-ethylene/propylene-styrene copolymer (SEPS), and styrene-ethylene/butylene-styrene copolymer (SEBS). In addition to (poly) styrene family, the following thermoplastic elastomers can be used: polyolefin family, polyester family, polyamide family, and polyurethane family.

The softener is used to allow the thermoplastic elastomer composition to have a proper degree of flexibility and elasticity. But if the thermoplastic elastomer composition contains more than 500 parts by weight of the softener, the softener may bleed from the surface of the substance dynamically crosslinked or may inhibit crosslinking. Thus the rubber component is not crosslinked sufficiently, and the property of the thermoplastic elastomer composition (A) may deteriorate.

It is more favorable that the thermoplastic elastomer composition contains not less than 10 parts by weight of the softener nor more than 150 parts by weight of the rubber component.

The thermoplastic elastomer composition (A) contains the olefin resin to improve the surface strength thereof and the flowability thereof. If the thermoplastic elastomer composition (A) contains more than 50 parts by weight of the olefin resin, the conductive roller or the like composed of the conductive elastomer composition has a high hardness and a large compression set.

It is more favorable that the thermoplastic elastomer composition (A) contains not less than 5 parts by weight of the olefin resin nor more than 20 parts by weight of the rubber component.

In the present specification, in the case of oil-unextended rubber, the part by weight of a rubber component indicates the part by weight of the oil-unextended rubber. In the case of the oil-extended rubber, the part by weight of the rubber component indicates the weight of only the rubber component obtained by subtracting the weight of the oil component from that of the oil-extended rubber. If the rubber consists of a mixture of the oil-extended rubber and the oil-unextended rubber, the part by weight of the rubber component indicates the sum of the weight of the rubber component obtained by subtracting the weight of the oil component from that of the oil-extended rubber and the weight of the oil-unextended rubber.

As the softener, oil and plasticizer can be used. As the oil, it is possible to use known synthetic oil such as paraffin oil, naphthenic oil, mineral oil of aromatic series, oligomer of hydrocarbon series or process oil. As the synthetic oil, it is possible to use oligomer of α-olefin, oligomer of butane, and amorphous oligomer of ethylene and α-olefin. As the plasticizer, it is possible to use dioctylphthalate (DOP), dibutylphthalate (DBP), dioctylsebacate (DOS), and dioctyladipate (DOA).

To allow the conductive elastomer composition to have preferable mechanical property, it is preferable to use the oil-extended rubber having a very large molecular weight. As the EPDM, it is possible to use Esprene 670F produced by Sumitomo Chemical, Esprene 601F produced by Sumitomo, and KELTAN 509×100 produced by Idemitsu DSM.

As the olefin resin, olefin resins commercially available can be used: polyethylene, polypropylene, ethylene ethylacrylate resin, ethylene vinyl acetate resin, ethylene methacrylate resin, ionomer resin, polyester resin, and chlorinated polyethylene. These resins can be used singly or in combination of two or more thereof. Other thermoplastic resins may be used. Of these olefin resins, polypropylene is particularly preferable because it has favorable processability, is capable of improving the strength of the conductive elastomer composition, and is compatible with the EPDM.

A resinous crosslinking agent can be used preferably to perform the dynamic crosslinking. The resinous crosslinking agent is a synthetic resin used to allow the rubber to make a crosslinking reaction by heating or the like. Unlike the case in which sulfur and a vulcanizing accelerator are used, the use of the resinous crosslinking agent prevents blooming from occurring and makes the permanent compression set of the conductive elastomer composition small. Therefore the resinous crosslinking agent is preferable because it is superior in keeping accuracy and durability of the conductive elastomer composition. Phenolic resin is particularly preferable.

As other resinous crosslinking agents, melamine-formaldehyde resin, triazine-formaldehyde condensate and hexamethoxymethyl-melamine resin can be used. The phenolic resin is particularly favorable.

As the phenolic resin, it is possible to use phenolic resins synthesized by reaction of phenols such as phenol, alkylphenol, cresol, xylenol, and resorcin with aldehydes such as formaldehyde, acetic aldehyde, and furfural. It is preferable to use alkylphenol-formaldehyde resin resulting from reaction of formaldehyde with alkylphenol having alkyl group connected to the ortho position or the para position of benzene, because the alkylphenol-formaldehyde resin is compatible with rubber and reactive, thus making a crosslinking reaction start time comparatively early. Alkyl group of the alkylphenol-formaldehyde resin has 1–10 carbon atoms. Thus methyl group, ethyl group, propyl group, and butyl group are exemplified. As the resinous crosslinking agent, it is possible to use modified alkylphenol resin formed by addition condensation of para-tertiary butyl phenol sulfide and aldehydes; and alkylphenol sulfide resin. The resinous crosslinking agent is used at favorably at not less than one part by weight nor more than 50 parts by weight and more favorably not less than eight parts by weight nor more than 15 parts by weight for 100 parts by weight of the rubber component.

The dynamic crosslinking in the present invention may be accomplished in the presence of halogen (chloride, bromide, fluoride, and iodine). To allow the halogen to be present in the dynamic crosslinking reaction, a halogenated resinous crosslinking agent is used or a halogen donor is added to the elastomer composition. As the halogenated resinous crosslinking agent, halogenated resins of the above-described addition condensation type can be used. Above all, halogenated phenol resin having at least one halogen atom connected to the aldehyde unit of the phenolic resin is favorable. Halogenated alkylphenol formaldehyde resin is most favorable because it is compatible with rubber and reactive and makes a crosslinking reaction start time comparatively early. Even though the thermoplastic elastomer composition contains the halogen, the halogen is present at only several percentages (less than 5%) of the crosslinking agent which is present at several percentages of the entire material. Thus the conductive elastomer composition of the present invention pollutes environment much less than a polymer containing vinyl chloride.

As the halogen donor, tin chloride such as stannic chloride, ferric chloride, and cupric chloride can be used. Chlorinated polyethylene can be used as the halogenated resin. The halogen donors can be used singly or in combination of two or more thereof.

A crosslinking activator may be used to accomplish the cross-liking reaction properly. Metal oxide is used as the crosslinking activator. As the metal oxide, zinc oxide and zinc carbonate are preferable.

In addition to the resinous crosslinking agent, it is preferable to use peroxides in performing the dynamic crosslinking because the use of the peroxides prevents blooming from occurring and decreases the extent of the compression set. The dynamic crosslinking may be performed by using sulfur.

In the case where the peroxide is used to perform the dynamic crosslinking, the following peroxides can be selectively used as necessary: 2,5-dimethyl-2,5-di(t-butyl peroxy)hexyne-3; 2,5-dimethyl-2,5-di(t-butyl peroxy) hexane; and dicumylperoxide. In performing the crosslinking reaction by using the peroxide, to improve and adjust the mechanical properties of the roller or the like such as fatigue characteristic and improve a crosslinking density, the following crosslinking assistants may be used: triallyl isocyanurate (TAIC), triallyl cyanurate (TAC), trimethylolpropane trimethacrylate (TMPT), and ethylene glycoldimethacrylate (EDMA). As necessary, resin and sulfur may be used in combination with the peroxide in performing the crosslinking reaction.

A filler may be contained in the conductive polymer composition as necessary to improve its mechanical strength so long as the filler does not damage the electrical characteristic and other properties thereof. As the filler, it is possible to use powder of silica, carbon black, clay, talc, calcium carbonate, magnesium carbonate, aluminum hydroxide, and the like. It is preferable that the thermoplastic elastomer composition contains less than 60 parts by weight of the filler for 100 parts by weight of rubber. If the filler is used at more than 60 parts by weight, the flexibility of rubber may deteriorate.

The conductive polymer composition may contain an age resistor, wax, and the like if necessary. As the age resistor, it is possible to use imidazoles such as 2-mercaptobenzimidazole; amines such as phenyl-α-naphthylamine, N,N'-di-2-naphthyl-p-phenylenediamine, and N-phenyl-N'-(1,3-dimethylbutyl)-p-phenylenediamine; and phenols such as 2-6-Di-tert-butyl-4-methylphenol and styrenated phenol.

To obtain the conductive thermoplastic elastomer composition of the present invention, before the thermoplastic elastomer composition (A) and the ionic-conductive agent (B) are mixed with each other, the thermoplastic elastomer composition is dynamically crosslinked.

More specifically, after the crosslinkable rubber and/or the crosslinkable thermoplastic elastomer are dispersed in the thermoplastic resin and/or the thermoplastic elastomer by dynamically crosslinking the crosslinkable rubber and/or the crosslinkable thermoplastic elastomer by an extruder or a kneader, an obtained composition is kneaded by using the extruder or the kneader again and the ionic-conductive agent is mixed with the obtained composition. Thereby the conductive thermoplastic elastomer composition is obtained.

The ionic-conductive agent (B) has a characteristic that it hardly enters a dynamically crosslinked domain phase, but is selectively mixed into the matrix phase. Thus according to the above-described method, the ionic-conductive agent (B) is selectively disposed in the matrix of the conductive thermoplastic elastomer composition. That is, the ionic-conductive agent (B) can be locally present in the thermoplastic elastomer which is the matrix of the conductive thermoplastic elastomer composition. Consequently the ionic-conductive agent (B) contained in the conductive thermoplastic elastomer composition does not adversely affect a crosslinking degree of the rubber. Thus it is possible to suppress the increase of the compression set. Further it is unnecessary to increase the amount of use of the ionic-conductive agent (B). Therefore it is possible to prevent the increase in the hardness of the conductive thermoplastic elastomer composition and reduce the material cost. Thereby the ionic-conductive agent (B) can be disposed on the surface of the conductive elastomer composition.

In the method of producing the conductive elastomer composition containing the ionic-conductive agent (B) and the carbon black (C) in addition to the thermoplastic elastomer composition (A), the thermoplastic elastomer composition (A) is dynamically crosslinked before the thermoplastic elastomer composition (A) and the ionic-conductive agent (B) are mixed with each other.

In kneading the ionic-conductive agent (B), the carbon black (C), and the thermoplastic elastomer composition (A), it is possible to supply the ionic-conductive agent (B) and the carbon black (C) to the extruder or the kneader at the same time. But it is preferable to knead the ionic-conductive agent (B) and the carbon black (C) to disperse the carbon black (C) uniformly in the ionic-conductive agent (B), obtain a conductive composite material, and then knead the conductive composite material and the thermoplastic elastomer composition (A).

The carbon black (C) is dispersed in the ionic-conductive agent (B) by kneading the ionic-conductive agent (B) and the carbon black (C), as described above. Thereby it is possible to improve the conductivity of the conductive elastomer composition by using a small amount of the carbon black.

It is preferable that the heating temperature at the time of the dynamic crosslinking is 160° C. to 200° C. and that the heating period of time is one to 20 minutes. It is preferable that the heating temperature at the time when the ionic-conductive agent (B) is mixed with the thermoplastic elastomer composition is 160° C. to 220° C. and that the heating period of time is one to 20 minutes. To facilitate operations to be performed in later processes, it is preferable to pellet the thermoplastic elastomer composition (A) obtained by the dynamic crosslinking. Thereby favorable moldability can be obtained.

A biaxial extruder, a Banbury mixer, and a kneader can be used to perform the dynamic crosslinking and the kneading. It is possible to dynamically crosslink the thermoplastic elastomer composition (A) after the thermoplastic elastomer composition (A) is mixed with the ionic-conductive agent (B).

The conductive elastomer composition of the present invention has a high flowability and thus a high moldability. Thus the conductive elastomer composition can be extruded tubularly or injection-molded. The conductive roller can be formed of the conductive elastomer composition by a known method described below.

The conductive elastomer composition of the present invention is shaped into a pellet. The pellet is molded tubularly by an injection molder. After the surface of the molded conductive elastomer composition is polished, it is cut to a predetermined size to obtain the conductive roller. In producing the conductive roller, it is possible to use a mono-axial extruder instead of the injection molder to extrude the pellet tubularly and polish the surface of the tube as necessary and then cut it.

The present invention provides the conductive roller, for use in an electrophotographic apparatus, formed by molding the conductive elastomer composition.

That is, the conductive thermoplastic elastomer of the present invention is excellent in that it has a very low volume resistivity, a small compression set, and a low hardness. Because the conductive roller composed of the conductive thermoplastic elastomer has a low electric resistance value, the conductive roller is used for a printer, an electrostatic copying machine, a facsimile apparatus, and an electrophotographic apparatus such as an ATM. In particular, the conductive roller can be used suitably for conductive members which requires to have a low electric resistance value. Thus the conductive roller is used as a transfer roller, a charging roller, a toner supply roller, a developing roller, and a driving roller of a color copying machine and the like.

Above all, the conductive roller can be used suitably for the driving roller of an image-forming mechanism of the electrophotographic apparatus. The driving roller drives a transfer belt of the image-forming mechanism of the electrophotographic apparatus from the inner side of the transfer belt. The driving roller is required to have a low compression set and a high precision.

In the case where a semi-conductive thermoplastic elastomer composition is formed by using the thermoplastic elastomer composition and the ionic-conductive agent and not the carbon black, it is preferable to form the semi-conductive thermoplastic elastomer composition as an antistatic paper-feeding roller.

More specifically, the present invention provides a paper-feeding roller having a compression set less than 30% when the compression set is measured at a temperature of 70° C. for 22 to 24 hours in a test method specified in JIS K6262 and a Shore hardness of not less than 10 nor more than 50 and a surface resistivity of less than $10^{11}$ [Ω] when the surface resistivity is measured at an applied voltage of 1000V in a test method specified in JIS K6911.

Because the paper-feeding roller has a low surface resistivity, it is possible to prevent a static electricity from being generated thereon. Therefore the paper-feeding roller can be used suitably for a printing apparatus, for example, an injection printer or an electrostatic copying machine having a mechanism, required to form a high-quality image, that adversely affects an image by a static electricity charged on a transport medium such as paper.

The surface (surface of contact between roller and object such as paper, film, and the like to be transported) of the antistatic paper-feeding roller should consist of the semi-conductive thermoplastic elastomer composition. More specifically, a tubular molded member composed of an elastomer composition is fitted on the periphery of a metal shaft consisting of metal or ceramic. An adhesive agent may be provided between the metal shaft and the paper-feeding roller. The surface of the paper-feeding roller may be abraded to increase its friction coefficient so that the surface thereof contacts paper with a large gripping force for paper or the like.

The reason the compression set of the paper-feeding roller is set to less than 30% is as follows: If the compression set of the paper-feeding roller is set to more than 30%, a dimensional change of the paper-feeding roller is so large that it is unsuitable for practical use. It is more favorable that the compression set of the paper-feeding roller is set to less than 25%. The smaller the compression set, the better.

The Shore hardness of the paper-feeding roller measured by the method specified in JIS K-6253 (durometer of type A) is set to not less than 10 nor more than 50 to make a nip width large.

If the Shore hardness is less than 10, the paper-feeding roller is so soft that its compression set is too large. On the other hand, if the Shore hardness is more than 50, the paper-feeding roller is so hard that a sufficient nip width cannot be obtained.

DETAILED DESCRIPTION OF THE PREFERRED EMBODIMENTS

The embodiments of the present invention will be described below with reference to the drawings.

Figure 1:
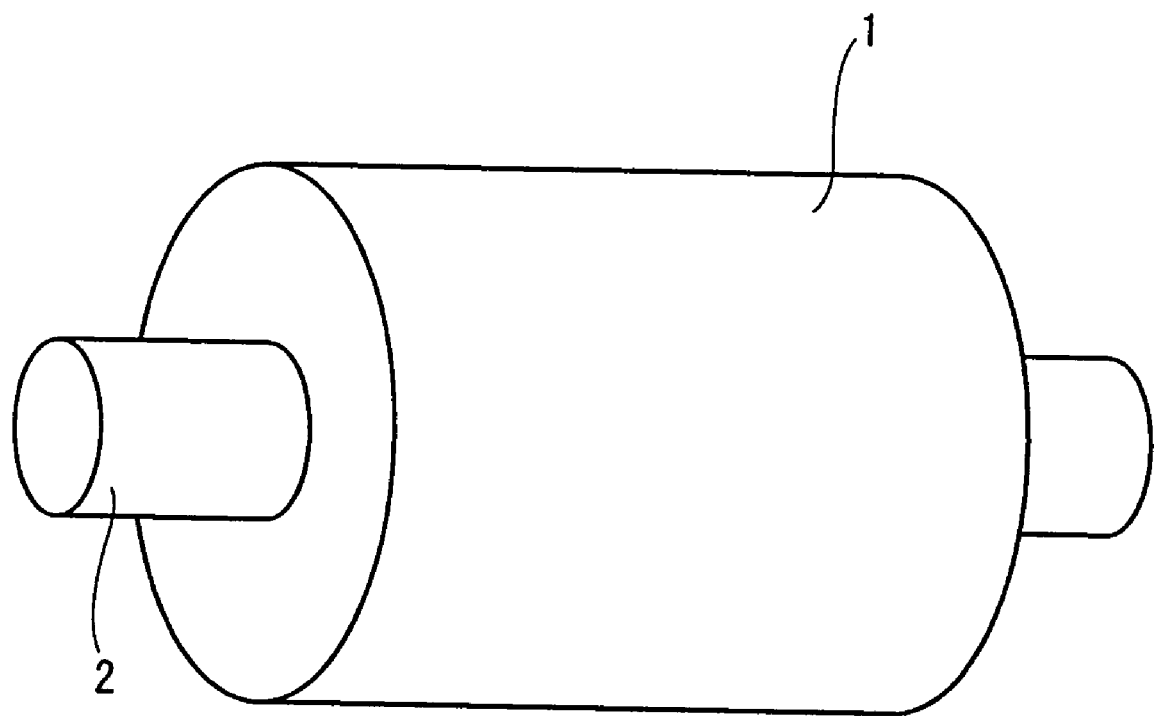
FIG. 1 is a schematic view showing a conductive roller of the present invention.

To form a conductive roller 1 of a first embodiment, as shown in FIG. 1, a conductive elastomer composition composed of the following compositions is shaped into a cylindrical roller. Then a shaft 2 is inserted into a hollow portion of the roller by press fit or the shaft 2 and the roller are bonded to each other with an adhesive agent.

A thermoplastic elastomer composition (A) of the first embodiment includes a compound (A1) containing a styrene thermoplastic elastomer as its main component; and a compound (A2), containing a rubber component whose main component is EPDM, dispersed in the compound (A1) by dynamically crosslinking the compound (A2).

The rubber component of the compound (A2) consists of oil-extended EPDM. The compound (A2) contains oil whose amount is equal to that of the rubber component. The compound (A1) contains a hydrogenated styrene thermoplastic elastomer (SEEPS) having a number-average molecular weight of 300,000, polypropylene which is an olefin resin, and oil whose amount is equal to the sum of the amount of the SEEPS and that of the olefin resin.

As an ionic-conductive agent (B) containing a metal salt and a block copolymer resin containing polyether essentially, an ionic-conductive agent composed of a mixture of nylon 12 homopolymer and a polyether block nylon 12 copolymer and a monohydrate of sodium perchlorate added to the mixture is used. The conductive elastomer composition contains the ionic-conductive agent (B) in such a way that the ionic-conductive agent (B) is dispersed in the matrix component of the entire conductive elastomer composition at a volume fraction of 32% with respect to the matrix component.

As a crosslinking agent, a phenolic resin crosslinking agent is used. Zinc oxide is used as a crosslinking activator. Paraffin oil is used as a softener to improve processability of the conductive elastomer composition and adjust its hardness.

The compression set of the conductive elastomer composition of the first embodiment is 25% when the compression set is measured at a temperature of 70° C. for 22 to 24 hours in the permanent set testing methods for rubber, vulcanized or thermoplastic specified in JIS K6262. The volume resistivity of the conductive elastomer composition is $10^{8.7}$ ($\Omega\cdot$cm) when it is measured at an applied voltage of 1000V in the method specified in JIS K6911. The hardness of the conductive elastomer composition is 54 when it is measured in the method specified in JIS K-6253 (durometer of type A is used as tester).

After the compound (A1), the compound (A2), and additives are mixed with one another by using a kneader or a mixer, rubber is dispersed in a mixture by dynamically crosslinking the rubber. After a required amount of the ionic-conductive agent is added to the mixture, the components are mixed by using the kneader or the mixer again. Thereby the conductive elastomer composition is obtained. The obtained conductive elastomer composition is formed into a roller-like configuration by using the extruder.

The obtained conductive roller 1 has rubber-like durability, elasticity, flexibility, and thermoplastic resin-like moldability and realizes a low electric resistance. The conductive roller 1 does not generate a harmful gas when it is scraped and burnt. That is, the conductive roller 1 does not pollute environment and has thermoplasticity. Thus the conductive roller 1 is recyclable.

Figure 2:
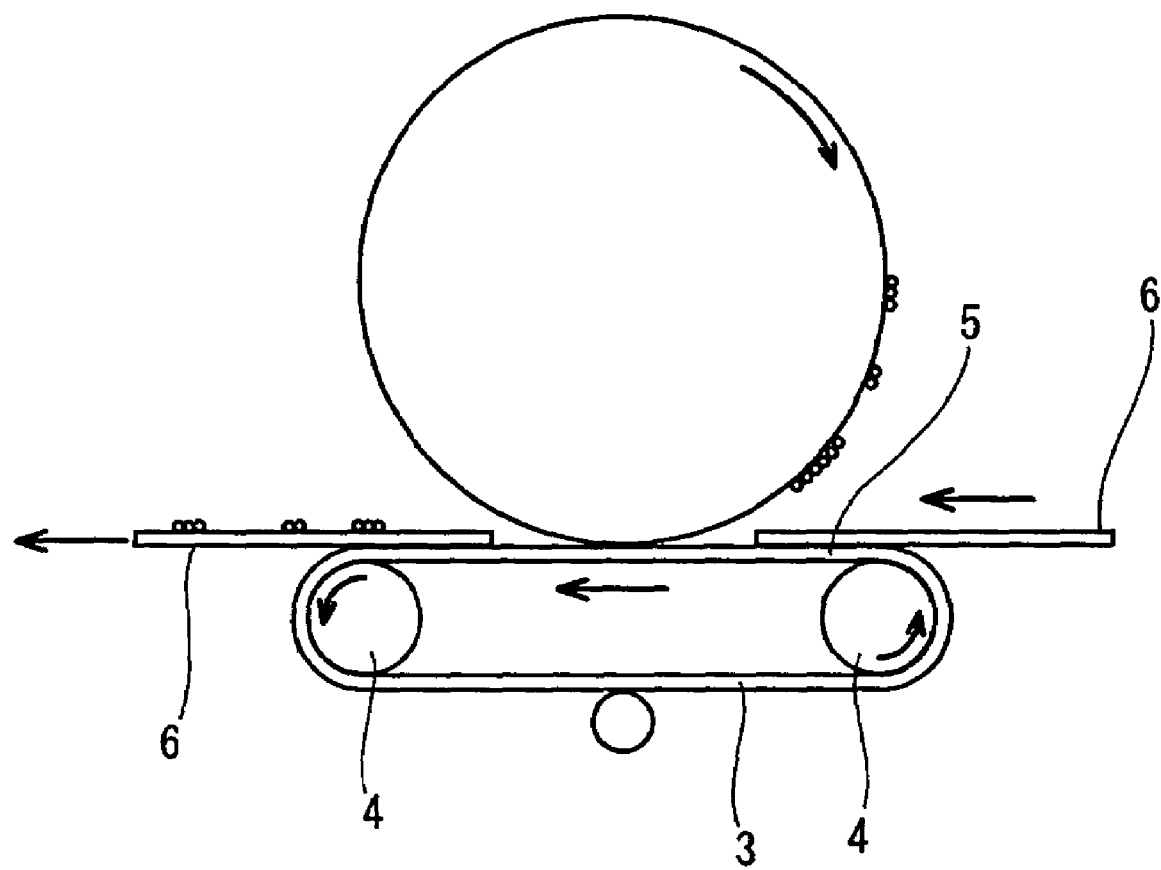
FIG. 2 is a schematic view showing a conductive belt of the present invention.

As shown in FIG. 2, a conductive belt 3 such as a transfer belt may be composed of the conductive elastomer composition. The conductive belt 3 is tight-stretched by two or more pulleys 4. The conductive belt 3 serves as a means for transporting a sheet 6 such as paper by movably holding it on its straight portion 5 disposed at its upper side and transferring a toner image formed on a photosensitive member to the sheet 6.

Examples of the first embodiment of the present invention and comparison examples will be described in detail below.

The composition, of each of the examples and the comparison examples, containing components shown in tables 1 and 2 was formed into a roller-like configuration, as described below. A shaft was inserted into each roller. Thereby the conductive roller of each of the examples and the comparison examples was prepared.

TABLE 1

|  | E1 | E2 | E3 | E4 | E5 | E6 |
|---|---|---|---|---|---|---|
| Rubber | 65 | 65 | 65 | 65 | 65 | 65 |
| Hydrogenated styrene TPE | 20 | 20 | 20 | 20 | 20 | 20 |
| Olefin resin 1 | 15 | 15 | 15 | 15 | 15 | 15 |
| Softener | 100 | 100 | 100 | 100 | 100 | 100 |
| Conductive agent 1 | 38 |  |  | 25 | 63 | 6 |
| Conductive agent 2 |  | 38 |  |  |  |  |
| Conductive agent 3 |  |  | 38 |  |  |  |
| Crosslinking agent 1 | 2.0 | 2.0 | 2.0 | 2.0 | 2.0 | 2.0 |
| Crosslinking agent 2 | 5.9 | 5.9 | 5.9 | 5.9 | 5.9 | 5.9 |
| Crosslinking activator | 3.3 | 3.3 | 3.3 | 3.3 | 3.3 | 3.3 |
| The volume percentage of the ionic-conductive agent in the matrix (vol. %) | 32 | 33 | 32 | 24 | 44 | 7 |

TABLE 1-continued

|  | E1 | E2 | E3 | E4 | E5 | E6 |
|---|---|---|---|---|---|---|
| the volume resistivity $\log_{10}R$ ($\Omega \cdot cm$) | 8.7 | 9.8 | 9.2 | 9.0 | 8.5 | 12.4 |
| Hardness | 54 | 52 | 53 | 52 | 65 | 47 |
| Compression set | 25 | 29 | 25 | 21 | 30 | 17 |
| Test for examining stain on photosensitive member | ○ | ○ | ○ | ○ | ○ | ○ |
| Moldability | ○ | ○ | ○ | ○ | △ | ○ |
| Peripheral nonuniformity of electric resistance | 1.2 | 1.2 | 1.2 | 1.1 | 1.3 | 1.1 | where E denotes example.

TABLE 2

|  | CE1 | CE2 | CE3 | CE4 |
|---|---|---|---|---|
| Rubber | 65 | 65 |  | (ionic-conductive thermoplastic elastomer composition (contain phthalic esters) 100 |
| Hydrogenated styrene TPE | 20 | 20 |  |  |
| Olefin TPE |  |  | 70 |  |
| Olefin resin 1 | 15 | 15 |  |  |
| Olefin resin 2 |  |  | 20 |  |
| Olefin resin 3 |  |  | 10 |  |
| Compatibilizer |  |  | 5 |  |
| Softener | 100 | 100 |  |  |
| Conductive agent 1 | 0 |  |  |  |
| Conductive agent 2 | 0 | 9 |  |  |
| Conductive agent 3 |  |  | 30 |  |
| Crosslinking agent 1 | 2.0 | 2.0 |  |  |
| Crosslinking agent 2 | 5.9 | 5.9 |  |  |
| Crosslinking activator | 3.3 | 3.3 |  |  |
| The volume percentage of the ionic-conductive agent in the matrix (vol. %) | 0 | 6 | 20 | — |
| The volume resistivity $\log_{10}R$ ($\Omega \cdot cm$) | 15.6 | 9.3 | 11.0 | 8.5 |
| Hardness | 46 | 48 | 70 | 27 |
| Compression set | 16 | 22 | 57 | 41 |
| Test for examining stain on photosensitive member | ○ | ○ | ○ | X |
| Moldability | ○ | △ | ○ | ○ |
| Peripheral nonuniformity of electric resistance | 1.2 | 2.5 | 1.2 | 1.1 | where CE denotes comparison example.

In the tables 1 and 2, the numerical values shown above the column showing the volume percentage of the ionic-conductive agent in the matrix indicate parts by weight. The abbreviation TPE in the tables shows the thermoplastic elastomer.

The materials used are as shown below. The oil content of the 100% oil-extended EPDM is included in the column of the softener. The value of only the rubber component is shown in the column of the rubber. That is, of 100 parts by weight of the softener shown in the table 1 and 2, 65 parts by weight is the oil contained in the oil-extended EPDM, and 35 parts by weight is the oil contained in the compound (A1).

Rubber: EPDM produced by Sumitomo Chemical, Esprene 670F (100% extended by paraffin oil)
Hydrogenated styrene TPE: SEEPS (Mn=300000, Mw=342000) produced by Kuraray, Septon 4077
Olefinic TPE: produced by Mitsui Chemicals, Milastomer 8030N
Olefin resin 1: polypropylene, Novatech PP BC6 produced by Japan Polychem
Olefin resin 2: produced by Mitsui Sumitomo Polyolefin, straight-chain low-density polyethylene, Ultozex 3520L
Olefin resin 3: produced by Mitsui Sumitomo Polyolefin, polypropylene, Mitsui Sumitomo Polypro B101WAT
Compatibilizer: produced by Sanyo Chemical Industries, maleic acid-modified polypropylene, Yumex 1010
ionic-conductive thermoplastic elastomer composition: a chlorine-containing thermoplastic elastomer composition containing phthalic ester produced by Tosoh, Elastage ES2520A
Conductive agent 1: monohydrate of sodium perchlorate is added to mixture of nylon 12+polyether block nylon 12 copolymer. Produced by Ciba Specialty Chemicals, IRGASTAT P18
Conductive agent 2: metal salt is added to polyether-polyolefin copolymer. Produced by Sanyo Chemical Industries, Pelestat 300
Conductive agent 3: monohydrate of sodium perchlorate is added to mixture of nylon 6+polyether block nylon 6 copolymer. Produced by Ciba Specialty Chemicals, IRGASTAT P22
Conductive agent 4: Carbon black, produced by Ketjen Black International, Ketjen Black EC
Conductive agent 5: polyether block amide copolymer, produced by Elf Atochem. PEBAX MH1657
Softener: paraffin oil produced by Idemitsu Kosan, Diana process oil PW-380
Crosslinking agent 1: produced by Taoka Chemical, Tackyrol 250-III (resin crosslinking agent, halogenated alkylphenol resin)
Crosslinking agent 2: produced by Taoka Chemical, Tackrol 201 (resin crosslinking agent)
Crosslinking activator: zinc oxide, produced by Mitsui Kinzoku, zinc oxide white A pellet composed of the conductive elastomer composition of each of examples 1 through 6 and comparison examples 1 and 2 was prepared.

After a thermoplastic elastomer is swelled in a softener, the thermoplastic elastomer and a pellet of an olefin resin are kneaded at 160° C. to 220° C. for 1 to 20 minutes by a biaxial extruder, a kneader or a Banbury mixer to prepare a mixture (compound) of the thermoplastic elastomer, the olefin resin, and the softener. Then a pellet of the compound formed by a pelletizer, a pellet of oil-extended rubber, a reactive phenolic resin serving as a resinous crosslinking agent, and additives such as zinc oxide are supplied to the biaxial extruder. After they are kneaded at 160° C. to 230° C. for one to 20 minutes to dynamically crosslink the rubber, the mixture was extruded.

Thereafter an extruded composition was cooled and cut into a pellet. Conductive agents were mixed with the pellet of the dynamically crosslinked composition. Then the mixture was supplied to the biaxial extruder again to knead the mixture for 1–20 minutes at 160° C. –260° C. The mixture may be kneaded by the kneader or the Banbury mixer instead of the biaxial extruder. Thereafter the mixture of the dynamically crosslinked rubber composition and the conductive agents was formed into a pellet by a known method. The conductive elastomer composition of the comparison example 1 did not contain the conductive agent. The dynamically crosslinked composition of the comparison example 1 was also supplied to the biaxial extruder again and cut into a pellet.

In the conductive elastomer composition of the comparison example 3, after a pellet composed of an olefinic thermoplastic elastomer, olefin resins, a compatibilizer, and a conductive agent was dry-blended, the mixture was supplied to the biaxial extruder. After the mixture was kneaded at 160° C. to 260° C. for one to 20 minutes, the mixture was cooled and cut into a pellet. Unlike the comparison examples 1 and 2, kneading was performed once by the extruder.

A pellet of a thermoplastic elastomer composition commercially available was used in the comparison example 4.

Preparation of Test Sample

Each pellet was molded by an injection molder to form a slab sheet of 130 mm×130 mm×2 mm and a test sample as specified in JIS which will be described later.

Preparation of Roller

Each pellet was supplied to a resin extruder to extrude it tubularly. After a shaft was inserted into the tube and bonded thereto, the tube was cut to a required size and polished to form a conductive roller serving as a transfer roller on which a laser beam printer of Laser Jet 4050 manufactured by Hewlett Packard Inc was mounted. The tubular conductive roller had an inner diameter of 6 mm, an outer diameter of 14 mm, and a length of 218 mm.

EXAMPLES 1 THROUGH 6

As shown in table 1, the conductive roller of each of the examples 1 through 6 included a conductive polymer composition containing the compound (A1) containing the hydrogenated styrene thermoplastic elastomer, the olefin resin, and a required amount of the softener; and the compound (A2), containing the EPDM as its main component and a required amount of the softener, dispersed in the compound (A1) by dynamically crosslinking the compound (A2). An ionic-conductive agent containing the metal salt and the polyether-containing block copolymer resin was dispersed in each of the mixture of compounds (A1) and (A2) at a specified volume fraction. The amount of the ionic-conductive agent contained in the conductive elastomer composition of the comparison example 6 was 6 parts by weight, less than 10 parts by weight.

COMPARISON EXAMPLES 1 THROUGH 4

As shown in table 2, the conductive elastomer composition of each of the comparison examples 1 through 4 was composed of components not in conformity to the scope of the present invention. More specifically, the conductive elastomer composition of the comparison examples 1 and 2 did not contain the ionic-conductive agent containing the metal salt and the block copolymer resin essentially containing polyether. The thermoplastic elastomer composition of the comparison example 3 was not crosslinked. The thermoplastic elastomer composition of the comparison example 4 contained chlorine-containing thermoplastic elastomer commercially available.

The following tests were conducted on specimens and conductive rollers composed of the conductive polymer compositions of the examples and the comparison example. Evaluations of test results are shown in each table.

Measurement of Volume Resistivity

Slab sheets (130 mm×130 mm×2 mm) were prepared to measure the volume resistivity $\rho_v$ (Ω·cm) thereof at a constant temperature of 23° C., a constant relative humidity of 55%, and at an applied voltage of 1000V in the test method specified in JIS K6911 with a digital ultra high resistance meter R-8340A manufactured by Advantest Corporation.

In the tables, the volume resistivity is shown by common logarithm.

Measurement of Hardness

The hardness of each conductive roller was measured by using the method specified in JIS K-6253 (durometer of type A).

Measurement of Compression Set

The compression set of each specimen was measured at a temperature of 70° C. for 24 hours in accordance with "Permanent set testing methods for rubber, vulcanized or thermoplastic" specified in JIS K6262.

Test for Examining Stain on Photosensitive Member

The slab sheet of each of the examples and the comparison examples was kept for one week at 32.5° C. and a relative humidity of 90%, with each slab sheet pressed against a photosensitive member set in a cartridge (cartridge type: 4127X) of a laser beam printer of Laser Jet 4050 type produced by Hulet Packard Inc. After each fragment was removed from the photosensitive member, a half-tone printing was carried out by the printer in which the photosensitive member is set. Whether or not on printed sheets of paper there were stains caused by pollution of photosensitive member was visually checked to make evaluations at the following three criteria:

○: On printed paper no stain was observed when it was visually checked.

Δ: Low degree of stain (after five or less sheets of paper were printed, stains on the paper were hardly observed and thus no problem in use)

X: High degree of stain (after five or more sheets of paper were printed, stains on the paper could be still recognized visually)

Moldability

The pellet of each of the examples and the comparison examples was molded by an extruder. The moldability of each pellet was evaluated on the following basis:

○: A preferable extruded skin was obtained.

Δ: Bad extruded skin. A roller could not be prepared unless the extrusion speed was set low and an abrasion length was set large by extruding the pellet in such a way that the outer diameter of the roller was large.

X: Extrusion molding could not be performed.

Measurement of Peripheral Nonuniformity of Electric Resistance of Roller

Figure 3:
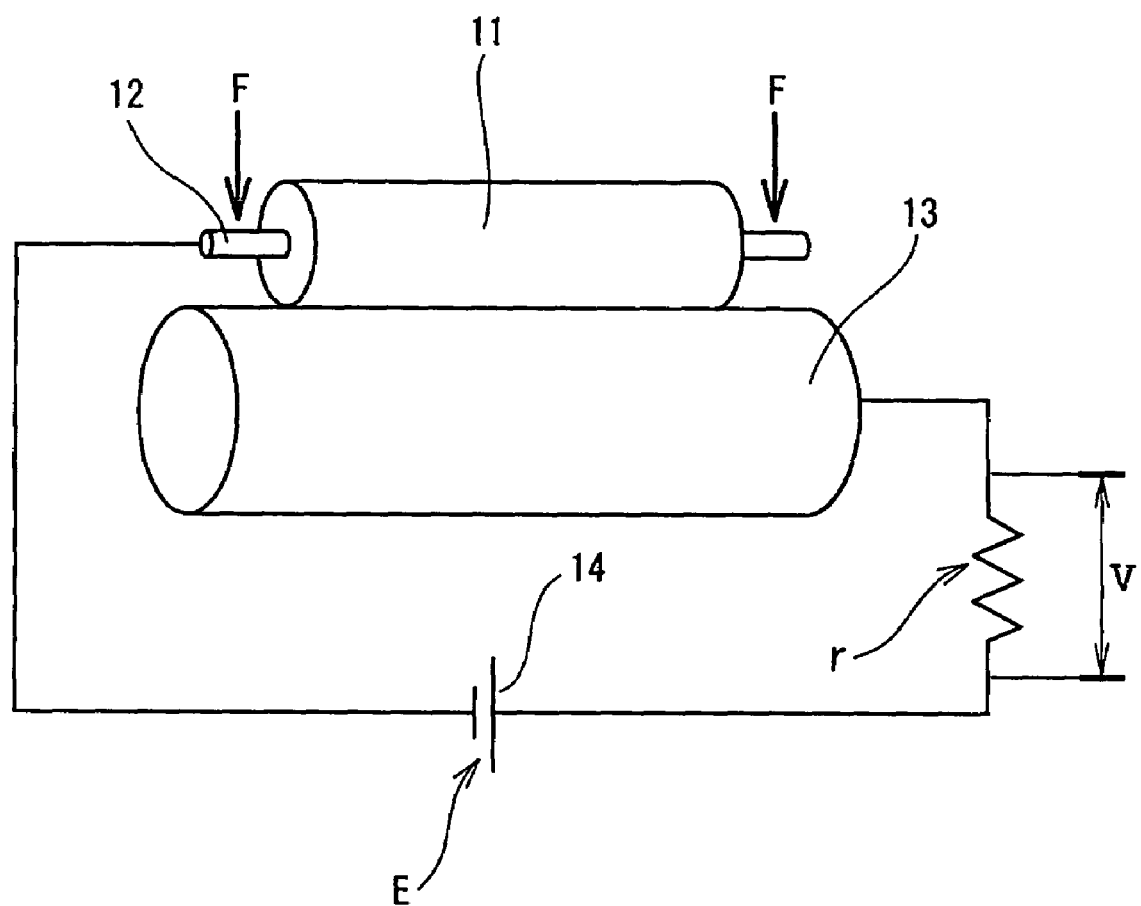
FIG. 3 is an explanatory view for showing the method of measuring the peripheral nonuniformity of an electric resistance of the conductive roller.

As shown in FIG. 3, to measure peripheral nonuniformity of the electric resistance of each conductive roller 11, the conductive roller 11 through which a metal shaft 12 was inserted was mounted on an aluminum drum 13, with the conductive roller 11 in contact with the aluminum drum 13. The leading end of a conductor, having an internal resistance of r (100 Ω), connected to the positive side of a power source 14 was connected to one end surface of the aluminum drum 13, and the leading end of a conductor connected to the negative side of the power source 14 was connected to one end surface of the conductive roller 11.

A voltage applied to the internal resistance r of the electric wire was detected. The detected voltage was V.

Supposing that a voltage applied to the apparatus is set to E, the resistance R of the roller is: $R = r \times E/(V-r)$. Because the term of $(-r)$ is regarded as being slight, $R = r \times E/V$ A load F of 500 g was applied to both ends of the metal shaft 12. The roller rotated at 30 rpm. The applied voltage E was 500V. The detected voltage V was measured at 100 times during four seconds. The resistance R was computed by using the above equation. The ratio of a computed maximum resistance value to a computed minimum resistance value was set as the peripheral nonuniformity. It is preferable that the peripheral nonuniformity is not less than 1.0 nor more than 1.2. The measurement was conducted at a constant temperature of 23° C. and a constant humidity of 55%.

As shown in table 1, the conductive roller of each of the examples 1 through 5 contained the specified amount of the ionic-conductive agent. Thus it was confirmed that the conductive roller had a low volume resistivity, a small compression set, and a proper hardness. Further the conductive roller did not stain the photosensitive member, was excellent in its moldability, and had a proper peripheral nonuniformity, i.e., had a preferable electrical characteristic. Because the conductive elastomer composition composing the conductive roller was thermoplastic, the conductive roller is recyclable. Because the conductive elastomer composition did not contain chlorine, it does not pollute environment. Example 6 contained a small amount of the ionic-conductive agent. Therefore, example 6 had high electrical characteristic, but had a low peripheral nonuniformity.

As shown in the table 2, the conductive roller of the comparison example 1 did not contain the conductive agent. Thus the conductive roller had a high resistance value and was hence unsuitable as a conductive member. The conductive roller of the comparison example 2 contained carbon as its conductive agent and hence had a large variation in the electric resistance. That is, the roller had a large peripheral nonuniformity. Further the moldability of the conductive elastomer composition was not favorable. The conductive roller of the comparison example 3 had a high compression set and was hence unsuitable as a conductive member. The conductive roller had high hardness and volume resistivity. The conductive roller of the comparison example 4 stained the photosensitive member and had a large compression set. Hence the conductive roller was unsuitable as a conductive member. The conductive elastomer composition composing the conductive roller contained a large amount of materials such as chlorine and phthalic esters not favorable to environment. Thus it is conceivable that the use thereof is prohibited by the law or self-imposed controls.

The conductive elastomer composition of the present invention includes the thermoplastic elastomer composition (A) containing the compound (A1) composed of the thermoplastic resin and/or the thermoplastic elastomer and the compound (A2), composed of a crosslinkable rubber and/or a thermoplastic elastomer, dispersed in the compound (A1) by dynamically crosslinking the compound (A2). Thus the conductive elastomer composition has rubber-like durability, elasticity, flexibility, and resin-like moldability. Further the ionic-conductive agent (B) containing the metal salt and the polyether-containing block copolymer resin is dispersed in the matrix component of the thermoplastic elastomer composition (A). Therefore it is possible to keep preferable property of the thermoplastic elastomer composition (A) serving as the base material and reduce the electric resistance effectively. Further the conductive elastomer composition has a proper hardness and does not stain the photosensitive member. Furthermore it is possible to prevent the electric resistance from fluctuating.

According to the present invention, after the thermoplastic elastomer composition (A) is dynamically crosslinked, the ionic-conductive agent (B) is mixed therewith. Thus the ionic-conductive agent (B) is selectively disposed in the matrix of the thermoplastic elastomer composition (A). Consequently it is possible to suppress deterioration of properties (increase of hardness and compression set) of the conductive elastomer composition, even though the conductive elastomer composition contains the ionic-conductive agent (B). Further it is unnecessary to increase the use amount of the ionic-conductive agent (B). Therefore it is possible to reduce the material cost.

The semi-conductive elastomer composition of the second embodiment of the present invention will be described below.

The semi-conductive elastomer composition of the second embodiment includes a compound (A1) containing a styrene thermoplastic elastomer as its main component; and a compound (A2), containing a rubber component whose main component is EPDM, dispersed in the compound (A1) by dynamically crosslinking the compound (A2) with two kinds of resinous crosslinking agents (12 parts by weight in total) and a crosslinking activator (3.5 parts by weight).

The compound (A1) contains styrene-ethylene-ethylene/propylene-styrene copolymer (SEEPS), polypropylene (PP) which is an olefin resin, and paraffin oil serving as a softener. The parts by weight of the compound (A1) used was 100 parts. SEEPS:PP:oil=100:35:170.

The compound (A2) consists of crosslinkable ethylene-propylene-diene rubber (EPDM) oil-extended by 100% by paraffin oil. The oil-extended EPDM was used 200 parts.

The ionic-conductive agent (B) contains polyamide 12, as its base resin, containing a block copolymer of the polyamide 12 and ether and sodium perchlorate as the metal salt. The ionic-conductive agent (B) is contained in the semi-conductive elastomer composition at 16.7 wt % for the sum of the weight of the compound (A1) and that of the ionic-conductive agent (B).

The semi-conductive thermoplastic elastomer composition has a compression set of 17% at a temperature of 70° C. for 22 to 24 hours and a Shore hardness of 39 and a surface resistivity of less than $10^{9.8}$ ($\Omega$) at an applied voltage of 1000V.

The method of producing the semi-conductive thermoplastic elastomer composition of the second embodiment is described in detail below.

After the hydrogenated styrene thermoplastic elastomer composition is swelled in the softener, the mixture and a pellet of an olefin resin are kneaded at 160° C. to 220° C. for 1 to 20 minutes by a biaxial extruder, a kneader or a Banbury mixer to prepare a pellet composed of a mixture (compound A1) of the hydrogenated styrene thermoplastic elastomer composition, the olefin resin, and the softener. Thereafter the pellet, the compound (A2) containing the oil-extended EPDM rubber, a phenolic resin serving as a resinous crosslinking agent, and required additives such as zinc white, age resistor, a filler, and the like are supplied to the biaxial extruder. After the components are kneaded at 160° C. to 220° C. for 1 to 20 minutes to dynamically crosslink the rubber, the mixture is extruded.

Thereafter an extruded composition is cooled to obtain a pellet. The ionic-conductive agent (B) is mixed with the pellet of the dynamically crosslinked composition. Then the mixture is supplied to the biaxial extruder again to knead the mixture for 1–20 minutes at 160° C. –220° C. Thereby the semi-conductive thermoplastic elastomer composition of the second embodiment is obtained. The mixture may be kneaded by the kneader or the Banbury mixer instead of the biaxial extruder. Thereafter the mixture (elastomer composition of the second embodiment) of the dynamically crosslinked composition and the conductive agent is formed into a pellet by a known method.

The semi-conductive elastomer composition is molded by using a known method to form a paper-feeding roller of the second embodiment. That is, the semi-conductive elastomer composition is extruded by using the extruder to obtain a tubular roller.

A pellet was molded by an injection molder to form a slab sheet of 130 mm×130 mm×2 mm and a test sample of a compression ball specified in JIS which will be described later. Properties thereof were evaluated as will be described below.

TABLE 3

|  | E7 | E8 | E9 | E10 | E11 | E12 | E13 | CE5 |  |
|---|---|---|---|---|---|---|---|---|---|
| Rubber | 200 | 200 | 200 | 200 | 200 | 200 | 200 | (ionic-conductive thermoplastic elastomer composition (contain phthalic esters) | 100 |
| Hydrogenated styrene TPE compound | 100 | 100 | 100 | 100 | 100 | 100 | 100 | | |
| Conductive agent 1 | 20 |  |  | 10 | 40 | 5 | 60 | | |
| Conductive agent 2 |  | 20 |  |  |  |  |  | | |
| Conductive agent 3 |  |  | 20 |  |  |  |  | | |
| Crosslinking agent 1 | 3.0 | 3.0 | 3.0 | 3.0 | 3.0 | 3.0 | 3.0 | | |
| Crosslinking agent 2 | 9.0 | 9.0 | 9.0 | 9.0 | 9.0 | 9.0 | 9.0 | | |
| Crosslinking activator | 3.5 | 3.5 | 3.5 | 3.5 | 3.5 | 3.5 | 3.5 | | |
| The volume percentage of the ionic-conductive agent in the matrix (vol. %) | 16.7 | 16.7 | 16.7 | 9.1 | 28.6 | 4.8 | 37.5 | | — |
| Surface resistivity $\log_{10} R$ (Ω) | 9.8 | 10.7 | 10.4 | 10.9 | 8.2 | 13.5 | 7.5 | | 8.2 |
| Hardness | 39 | 38 | 39 | 37 | 46 | 35 | 51 | | 27 |
| Compression set | 17 | 18 | 17 | 16 | 21 | 15 | 27 | | 41 |
| Test for evaluation printing performance (observed with a video microscope) | no abnormal | no abnormal | no abnormal | no abnormal | no abnormal | shear in printing | no abnormal | | no abnormal |
| Test for examining stain on photosensitive member | no stain | no stain | no stain | no stain | no stain | no stain | no stain | | stain | where E denotes example, and CE denotes Comparison example.

Since the antistatic paper-feeding roller is formed by molding the semi-conductive thermoplastic elastomer composition, it has rubber-like durability, elasticity, flexibility, and resin-like moldability. Further the antistatic paper-feeding roller realizes semi-conductivity. The antistatic paper-feeding roller does not contain chlorine nor generate a harmful gas when it is discarded. That is, the conductive roller does not pollute environment and is thermoplastic. Thus the conductive roller is recyclable. The semi-conductive thermoplastic elastomer composition has a high flowability and hence a high moldability. Thus the antistatic paper-feeding roller does not cause a shear to occur in printing and can be suitably used as a paper-feeding roller for an inject printer for forming a high-quality image.

Examples 7 through 13 of the paper-feeding roller of the second embodiment and comparison example 5 will be described in detail below.

In the paper-feeding roller of each of the examples 7 through 13, the paper-feeding roller and property evaluation slab sheet were prepared by using a pellet composed of an elastomer composition containing the components shown in table 3. Each pellet was prepared by using a method similar to that of the second embodiment.

In the comparison example 5, a paper-feeding roller and a property evaluation slab sheet were prepared as follows by using a pellet composed of a chlorine-containing thermoplastic elastomer composition (commercial name: Elastage) produced by Toso, similarly to the examples 7 through 13.

That is, a pellet of the elastomer composition prepared by using the method of the second embodiment was supplied to a resin extruder to extrude it tubularly. The tube was cut to obtain a paper-feeding roller having an inner diameter of 31 mm, an outer diameter of 36 mm, and a width of 17 mm.

The numerical values shown above the column of the volume fraction of the conductive agent contained in the matrix indicate parts by weight.

An ionic-conductive thermoplastic elastomer composition: a chlorine-containing thermoplastic elastomer composition containing phthalic ester produced by Tosoh, Elastage ES2520A Rubber: EPDM produced by Sumitomo Chemical, Esprene 670F (oil-extended by 100% with paraffin oil)

Hydrogenated styrene TPE compound: SEEPS (Mn=300000) produced by Kuraray, Septon 4077+PP (produced by Japan Polychem, Novatech PP BC6)+ paraffin oil (Produced by Idemitsu Kosan, Diana process oil PW-380); (SEEPS:PP:oil)=(100:35:170)

Conductive agent 1: polyether block nylon 12 resin+metal salt produced by Ciba Specialty Chemicals, IRG-ASTAT P18 (base resin is polyamide 12 containing block copolymer of polyamide 12 and ether and sodium perchlorate serving as metal salt)

Conductive agent 2: polyether-polyolefin copolymer+ metal salt. Produced by Sanyo Chemical Industries, Pelestat 300

Conductive agent 3: polyether block nylon 6 resin+metal salt. Produced by Ciba Specialty Chemicals, IRG-ASTAT P22 (base resin is polyamide 6 containing block copolymer of polyamide 6 and ether and sodium perchlorate serving as metal salt)

Crosslinking agent 1: produced by Taoka Chemical, Tackrol 250-III

Crosslinking agent 2: produced by Taoka Chemical, Tackrol 201

Crosslinking activator: zinc oxide, produced by Mitsui Kinzoku, zinc oxide white

EXAMPLES 7 THROUGH 13

In the examples 7 through 13, a dynamically crosslinked mixture of 200 parts by weight (including oil 100%) of the EPDM and 100 parts by weight of a hydrogenated styrene TPE compound was used as the thermoplastic elastomer composition. In the each of the examples 7, 10–13, the conductive agent 1 was used as the ionic-conductive agent (B) containing the metal salt and the polyether-containing block copolymer resin. In the examples 7, 10, 11, the conductive agent 1 was mixed with the thermoplastic elastomer composition in such a way that the conductive agent 1 was dispersed in the matrix component of the thermoplastic elastomer composition at 9.8 wt % to 28.6 wt % with respect to the matrix component of the thermoplastic elastomer composition. The conductive agent 1 was used at 4.8 wt % and 37.5 wt % in the examples 12 and 13 respectively for 100 wt % of the matrix component of the thermoplastic elastomer composition.

In the example 8, the conductive agent 2 was used as the ionic-conductive agent (B). In the example 9, the conductive agent 3 was used as the ionic-conductive agent (B). The conductive agent 2 and the conductive agent 3 were used at 16.7 wt % respectively for 100 wt % of the matrix component of the thermoplastic elastomer composition.

COMPARISON EXAMPLE 5

In the comparison example 5, a chlorine-containing ionic-conductive thermoplastic elastomer composition commercially available was used. The conductive elastomer composition of the comparison example 5 did not contain the ionic-conductive agent containing the metal salt and the polyether-containing block copolymer resin.

The thermoplastic elastomer composition and the paper-feeding roller of each of the examples 7 through 13 and the comparison example 5 were measured and examined on the following items.

Measurement of Surface Resistance of Slab Sheet

Slab sheets (130 mm×130 mm×2 mm) were prepared to measure the surface resistance at an applied voltage of 1 kV, a constant temperature of 23° C., and a constant relative humidity of 55% with a digital ultra high resistance meter R-8340A manufactured by Advantest Corporation Inc. Measurement was conducted in accordance with the surface-resistivity measuring method specified in JIS K6911.

Test for Evaluating Printing Performance

Each roller was mounted on an inject printer S300 manufactured by Canon to make a print of a prescribed format by the printer. To examine whether ink was spread normally, the printed surface of paper was observed with a video microscope for evaluation. If static electricity was generated on the roller, an image disorder was generated on the printed surface.

The method of checking whether or not printed sheets of paper were stained and the method of measuring the compression set and the hardness were carried out by using methods same as that described in table 1.

As shown in table 3, the paper-feeding roller composed of the semi-conductive thermoplastic elastomer composition of the examples 7 through 13 had a compression set less than 30% when the compression set was measured at a temperature of 70° C. for 22 to 24 hours and a Shore hardness not less than 10 nor more than 51. Further, the paper-feeding roller composed of the semi-conductive thermoplastic elastomer composition of the examples 7, 8, 9, 10, 11 and 13 had a surface resistivity less than $10^{11}(\Omega)$ when the surface resistivity was measured at an applied voltage of 1000V. No abnormality was detected in the test for evaluation of printing performance except of the example 12. No static electricity was generated on the roller. Thus a shear in printing was not generated on the surface of paper. Further the photosensitive member was not stained.

It was confirmed that the thermoplastic elastomer composition and the paper-feeding roller of each of the examples 7 through 13 had a hardness and a compression set respectively suitable for the paper-feeding roller and superior antistatic performance.

Since chlorine was not contained in the polymer of the material of each of the examples 7 through 13, the material does not pollute environment. Since the material of each of the examples 7 through 13 is thermoplastic, the material is recyclable and flowable. Thus the material has superior moldability.

Before the thermoplastic elastomer composition (A) and the ionic-conductive agent (B) are mixed with each other, the thermoplastic elastomer composition (A) is dynamically crosslinked. Therefore it is unnecessary to increase the use amount of the ionic-conductive agent (B), and the ionic-conductive agent (B) can be dispersed uniformly in the thermoplastic elastomer composition (A). Thus it is possible to prevent a rise of the hardness of the conductive elastomer composition and an increase of the material cost.

As shown in the table 3, because the composition of the comparison example 5 contains the conductive agents 1 through 3 and contains phthalic esters such as DOP, the composition has a high compression set and thus loosens after it is fitted on the core metal. Thus the composition is unsuitable as a conductive roller. Further the paper-feeding roller stained the photosensitive member. The paper-feeding roller of the example 12 contained a small amount of the conductive agent 1. More specifically, 4.8 wt % of the ionic-conductive agent (B) was mixed with 100 parts by weight of the matrix component of the thermoplastic elastomer composition (A). That is, the ionic-conductive agent (B) used was out of the specified range of not less than 9 wt % nor more than 30 wt %. Thus the surface resistance of the paper-feeding roller had a large common logarithm of 13.5. Therefore in the printing performance test, a shear was generated owing to generation of static electricity. But, the example 12 had a low compression set and the photosensitive member was not stained. Because the composition of the example 13 contained a very large amount (37.5 wt %) of the conductive agent 1, the paper-feeding roller had a hardness 51 and had a little low friction coefficient.

The third embodiment of the present invention will be described below.

Similarly to the first embodiment, the conductive elastomer composition of the third embodiment is molded as a cylindrical roller. A shaft is inserted into a hollow portion of the roller by press fit or the shaft and the roller are bonded to each other with an adhesive agent.

The conductive elastomer composition of the third embodiment includes a thermoplastic elastomer composition (A) containing a compound (A1) composed of a thermoplastic resin and/or a thermoplastic elastomer and a compound (A2), composed of a crosslinkable rubber and/or the thermoplastic elastomer, dispersed in the compound (A1) by dynamically crosslinking the compound (A2); an ionic-conductive agent (B), containing a metal salt and a polyether-containing block copolymer resin, dispersed in the thermoplastic elastomer composition (A); and carbon black (C) dispersed in the thermoplastic elastomer composition (A).

The conductive elastomer composition containing the carbon black (C) in addition to the ionic-conductive agent (B) has a compression set of 22% when the compression set is measured at a temperature of 70° C. for 22 hours and a volume resistivity of $10^6$ ($\Omega \cdot cm$) when it is measured at an applied voltage of 1000V. The conductive elastomer composition contains the ionic-conductive agent (B) and the carbon black (C) at 15.0 wt % and 2.3 wt % respectively for the whole weight of the conductive elastomer composition.

More specifically, as the thermoplastic resin and/or the thermoplastic elastomer, polypropylene (PP) and styrene-ethylene-ethylene/propylene-styrene copolymer (SEEPS) are used. As the crosslinkable rubber and/or the thermoplastic elastomer, ethylene-propylene-diene rubber is used. The conductive elastomer composition contains a required amount of a softener. The crosslinkable rubber and/or the thermoplastic elastomer are dynamically crosslinked with a resinous crosslinking agent.

As the ionic-conductive agent (B), IRGASTAT P18 produced by Chiba Specialty Chemicals was used. The IRGASTAT P18 contains polyamide 12, as its base resin, containing the block copolymer of the polyamide 12 and ether and sodium perchlorate as the metal salt.

As the carbon black (C), conductive Ketchen Black EC is used.

The method of producing the conductive elastomer composition of the third embodiment will be described in detail below.

In forming the thermoplastic elastomer composition (A), oil-containing SEEPS, PP, EPDM, and a crosslinking agent (Tacky Roll), and ZnO are supplied to a biaxial extruder and kneaded at 200° C. and 200 rpm. Before the extruded resin is pelletized, dynamic crosslinking is completed.

The ionic-conductive agent (B) and the carbon black (C) are kneaded at 200° C. to disperse the carbon black (C) in the ionic-conductive agent (B) uniformly. Thereby a conductive composite material is obtained.

Thereafter the conductive composite material is added to the crosslinked thermoplastic elastomer composition (A). Thereafter the conductive composite material and the thermoplastic elastomer composition (A) are kneaded at 200° C. and 200 rpm. Thereby the conductive thermoplastic elastomer composition of the third embodiment is produced.

The conductive thermoplastic elastomer composition is molded by a known method to form the conductive roller of the third embodiment. That is, the conductive thermoplastic elastomer composition is extruded by using an extruder to obtain a tubular roller.

The conductive roller thus formed has rubber-like durability, elasticity, flexibility, and resin-like moldability and realizes a high conductivity. The conductive roller does not contain sulfur and thus does not generate a harmful gas when it is discarded. That is, the conductive roller does not pollute environment and is thermoplastic. Thus the conductive roller is recyclable. The semi-conductive thermoplastic elastomer composition has a high flowability and thus has a high moldability. Thus the conductive roller can be used suitably as a driving roller of an electrophotographic apparatus.

The examples of the present invention and comparison examples will be described in detail below.

EXAMPLE 14

57 parts by weight of paraffin oil which is a softener was added to a mixture of 32 parts by weight of Septon 4077 (SEEPS), produced by Kuraray, which is a hydrogenated styrene thermoplastic elastomer and 11 parts by weight of polypropylene (PP) which is an olefin resin. After the mixture was allowed to stand overnight, it was extruded at 180° C. and 200 rpm by a biaxial extruder manufactured by Ipeck Inc. to obtain a pellet.

The following substances were added to the pellet: 3.5 parts by weight of zinc oxide, 12 parts by weight of a resinous crosslinking agent (9 parts by weight of Tackrol 201 produced by Taoka Chemical and 3 parts by weight of Tackrol 250-III produced by Taoka Chemical), 15 parts by weight of polypropylene (PP), and 200 parts by weight (of 200 parts by weight, 100 parts by weight was oil) of Esprene 670F (oil-extended EPDM) produced by Sumitomo Chemical. The mixture was supplied to the biaxial extruder to perform dynamic crosslinking at 200° C. and 200 rpm to obtain the thermoplastic elastomer composition (A).

100 parts by weight of an antistatic agent consisting of the ionic-conductive agent (B) (IRGASTAT P18 (base resin consisting of polyamide 12 containing metal salt and block copolymer of polyamide 12 and ether) produced by Ciba Specialty Chemicals) and 15 parts by weight of Ketjen Black EC which is the carbon black (C) were kneaded to disperse the carbon black (C) uniformly in the ionic-conductive agent (B). Thereby a conductive composite material was obtained.

69 parts by weight of the obtained conductive composite material and 330.5 parts by weight of the thermoplastic elastomer composition (A) prepared by a method similar to the above-described method were kneaded at 200° C. and 200 rpm by a biaxial extruder manufactured by Kobe Steel. In this manner, the conductive thermoplastic elastomer composition of the present invention was obtained. 15.0 wt % of the ionic-conductive agent (B) and 2.3 wt % of the carbon black (C) were used for the whole weight of the conductive thermoplastic elastomer composition.

The obtained materials were molded by injection molding to prepare a resistance-measuring flat plate. A compression set-measuring sample was prepared by molding the materials. The compression set was 25%. The volume resistivity was less than $10^6$ ($\Omega \cdot cm$).

EXAMPLE 15

The conductive thermoplastic elastomer composition of the example 15 was prepared by carrying out a method similar to that of the example 14 except that 66 parts by weight of a conductive composite material obtained by kneading 100 parts by weight of the Irgastat P18 which is the ionic-conductive agent (B) and 10 parts by weight of Ketchen Black EC which is the carbon black (C) to disperse the carbon black (C) uniformly in the ionic-conductive agent (B) and 330.5 parts by weight of the thermoplastic elastomer composition (A) formed by a method similar to that of the example 14 were kneaded by a biaxial extruder manufactured by Kobe Steel.

15.1 wt % of the ionic-conductive agent (B) and 1.5 wt % of the carbon black (C) were used for the whole weight of the conductive thermoplastic elastomer composition. The compression set was 23%. The volume resistivity was $10^{6.5}$ ($\Omega \cdot cm$)

EXAMPLE 16

The conductive thermoplastic elastomer composition of the example 16 was prepared by carrying out a method similar to that of the example 14 except that 64.5 parts by weight of a conductive composite material obtained by kneading 100 parts by weight of the Irgastat P18 which is the ionic-conductive agent (B) and 7.5 parts by weight of Ketjen Black EC which is the carbon black (C) to disperse the carbon black (C) uniformly in the ionic-conductive agent (B) and 330.5 parts by weight of the thermoplastic elastomer composition (A) formed by a method similar to that of the example 14 were kneaded by the biaxial extruder manufactured by Kobe Steel.

15.2 wt % of the ionic-conductive agent (B) and 1.1 wt % of the carbon black (C) were used for the whole weight of the conductive thermoplastic elastomer composition. The compression set was 23%. The volume resistivity was $10^{7.3}$ ($\Omega \cdot cm$)

EXAMPLE 17

The conductive thermoplastic elastomer composition obtained in the example 14 was extruded by a mono-axial extruder. A pipe having a diameter of 21 mm was inserted into the conductive thermoplastic elastomer composition. The conductive thermoplastic elastomer composition was polished to set the outer diameter of the obtained conductive roller to 23 mm.

EXAMPLE 18

The conductive thermoplastic elastomer composition of the example 18 was prepared except that 60 parts by weight of the Irgastat P18 not containing the carbon black and 330.5 parts by weight of the thermoplastic elastomer composition (A) formed by a method similar to that of the example 14 were kneaded by the biaxial extruder manufactured by Kobe Steel. That is, the conductive thermoplastic elastomer composition of the example 18 did not contain the carbon black (C).

15.4 wt % of the ionic-conductive agent (B) was used for the whole weight of the conductive thermoplastic elastomer composition. The compression set was 20%. The volume resistivity was $10^{8.6}$($\Omega \cdot cm$).

EXAMPLE 19

The conductive thermoplastic elastomer composition of the example 19 was prepared except that 63 parts by weight of a conductive composite material obtained by kneading 100 parts by weight of the Irgastat P18 and 5 parts by weight of Ketjen Black EC to disperse the Ketjen Black EC uniformly in the Irgastat P18 and 330.5 parts by weight of the thermoplastic elastomer composition (A) formed by a method similar to that of the example 14 was kneaded by the biaxial extruder manufactured by Kobe Steel.

15.2 wt % of the ionic-conductive agent (B) and 0.8 wt % of the carbon black (C) were used for the whole weight of the conductive thermoplastic elastomer composition. The compression set was 21%. The volume resistivity was $10^{8.3}$($\Omega \cdot cm$).

COMPARISON EXAMPLE 6

The conductive thermoplastic elastomer composition of the comparison example 14 was prepared except that 25 parts by weight of the Ketjen Black EC and 330.5 parts by weight of the thermoplastic elastomer composition (A) formed by a method similar to that of the example 14 were kneaded by the biaxial extruder manufactured by Kobe Steel.

That is, the conductive thermoplastic elastomer composition of the comparison example 6 did not contain the ionic-conductive agent (B).

7.0 wt % of the carbon black (C) was used for the whole weight of the conductive thermoplastic elastomer composition. The compression set was 38%. The volume resistivity was less than $10^6$ ($\Omega \cdot cm$).

Measurement and examination of the conductive thermoplastic elastomer composition of each of the examples 14–16 and 18, 19 and the comparison example 6 and the conductive roller of the example 17 were conducted on the following items.

Measurement of the volume resistivity and the compression set were conducted by using the same method as that described in table 1.

A Monsanto processability tester was used to examine the processability of each conductive thermoplastic elastomer composition by extruding it at 200° C.

The material of the example 14 was extruded at 200° C. to form a tube by using the Monsanto processability tester. As a result, the tube had fine and smooth strands on its surface. Thus it was confirmed that the conductive thermoplastic elastomer composition was thermoplastic.

The material of the example 15 was also extruded to form a tube by using the Monsanto processability tester. As a result, it was confirmed that the conductive thermoplastic elastomer composition could be extruded favorably.

The material of the example 16 was also extruded to form a tube by using a mono-axial extruder. As a result, it was confirmed that the conductive thermoplastic elastomer composition could be extruded favorably.

As described above, since the material of each of the examples 14 through 16 is flowable, the material could be extruded as a tube having a beautiful smooth surface. Thus, the material has excellent moldability and is recyclable. That is, the electric resistance value can be reduced greatly not by increasing the amount of the expensive ionic-conductive agent but by using a small amount of the carbon black. Therefore the material of each of the examples 14 through 16 is not costly. Since a small amount of the carbon black is used, the property of the material did not deteriorate. That is, the flowability and compression set did not deteriorate.

The conductive roller of the example 17 had a sufficiently smooth finish on its surface. The conductive roller was mounted on a copying machine to use it as a driving roller for a transfer belt. The result was that no slippage occurred and hence no problems occurred.

Because example 18 did not contain the carbon black, the volume resistivity of the conductive thermoplastic elastomer composition of the comparison example 18 was $10^{8.6}$ ($\Omega \cdot cm$). Because the Irgastat P18 contained only five parts by weight of carbon black, the volume resistivity of the conductive thermoplastic elastomer composition of the comparison example 19 was $10^{8.3}$ ($\Omega \cdot cm$). The conductive thermoplastic elastomer composition of the comparison example 6 had a volume resistivity less than a lower limit of measurement and a compression set of 38%. The conductive thermoplastic elastomer composition of the comparison example 6 was slowly extruded to form a tube by using the mono-axial extruder. The result was that the tube had a very high temperature and a rough surface. That is, the tube had a low moldability.

The conductivity of the conductive thermoplastic elastomer composition of each of the examples 14 through 16 is improved not by increasing the amount of the expensive ionic-conductive agent but by using a small amount of the carbon black. Thus the conductive thermoplastic elastomer composition has a volume resistivity less than $10^{8.6}(\Omega \cdot cm)$, more favorably $10^{8}(\Omega \cdot cm)$ and most favorably $10^{6}(\Omega \cdot cm)$ when the volume resistivity is measured at an applied voltage of 1000V. Therefore the conductive thermoplastic elastomer composition can be produced at a low cost, is thermoplastic, and is recyclable. Further since a small amount of the carbon black is used, the flowability and compression set of the conductive thermoplastic elastomer composition does not deteriorate. Since the conductive thermoplastic elastomer composition of the examples 14 through 16 is flowable, it is easy to produce the conductive roller.

As described above, according to the present invention, the base material of the conductive elastomer composition is the thermoplastic elastomer composition (A) containing the compound (A1) composed of the thermoplastic resin and/or the thermoplastic elastomer and the compound (A2), composed of the crosslinkable rubber and/or the thermoplastic elastomer, dispersed in the compound (A1) by dynamically crosslinking the compound (A2). Thus the conductive elastomer composition is allowed to have rubber-like durability, elasticity, flexibility, and resin-like moldability. In addition, the ionic-conductive agent (B), containing the metal salt and the polyether-containing block copolymer resin, is dispersed in the base material. Thus it is possible to keep preferable properties of the thermoplastic elastomer composition and reduce the electric resistance effectively. Further the conductive elastomer composition has a proper hardness, does not stain the photosensitive member, and is capable of reducing variation of the electric resistance.

When the conductive elastomer composition contains the ionic-conductive agent (B) and the carbon black (C), the conductive elastomer composition can be enhanced in its conductivity and has high flowability and moldability. Since the conductive elastomer composition does not pollute environment and is thermoplastic, it is recyclable and can be manufactured at a low cost.

Therefore the conductive elastomer composition of the present invention is preferably used for conductive members such as conductive belts such as a transfer belt and conductive rollers, for example, a transfer roller, a driving roller, and a developing roller, a charging roller, and the like for a copying machine, a printer, and the like. Since the conductive polymer composition of the present invention does not pollute environment and is thermoplastic, it is recyclable and can be manufactured at a low cost.

According to the method of producing the conductive elastomer composition of the present invention, after the thermoplastic elastomer composition (A) is dynamically crosslinked, the ionic-conductive agent (B) is mixed with the thermoplastic elastomer composition (A). Thus the ionic-conductive agent (B) is selectively disposed in the matrix of the dynamically crosslinked thermoplastic elastomer composition (A). Consequently it is possible to suppress deterioration of properties (increase of hardness and compression set) of the conductive elastomer composition, even though the conductive elastomer composition contains the ionic-conductive agent (B). Further it is unnecessary to increase the use amount of the ionic-conductive agent. Therefore it is possible to reduce the material cost.

What is claimed is:

1. A conductive elastomer composition comprising a thermoplastic elastomer composition (A) containing a compound (A1) composed of a thermoplastic resin and/or a thermoplastic elastomer and a compound (A2), composed of a crosslinkable rubber and/or a crosslinkable thermoplastic elastomer, dispersed in said compound (A1) by dynamically crosslinking said compound (A2); and an ionic-conductive agent (B), containing a metal salt and a polyether-containing block copolymer resin, mixed with and dispersed in said thermoplastic elastomer composition (A).

2. The conductive elastomer composition according to claim 1, having a volume resistivity not more than $10^{11}$ ($\Omega \cdot cm$), when said volume resistivity is measured at an applied voltage of 1000V in a method specified in JIS K6911.

3. The conductive elastomer composition according to claim 1, further comprising carbon black (C) and having a volume resistivity not more than $10^{8}(\Omega \cdot cm)$, when said volume resistivity is measured at an applied voltage of 1000V in a method specified in JIS K6911.

4. The conductive elastomer composition according to claim 1, wherein said polyether-containing block copolymer resin contained in said ionic-conductive agent consists of one or more resins selected from the group consisting of a polyether block amide copolymer resin, a modified substance of a polyether ester amide resin, and a polyether block polyolefin resin.

5. The conductive elastomer composition according to claim 1, wherein said ionic-conductive agent consists of a composition containing a mixture of a polyether block amide copolymer resin and a polyamide homopolymer and a metal salt.

6. The conductive elastomer composition according to claim 1, containing said ionic-conductive agent (B) at a volume fraction of not less than 8% nor more than 45%.

7. The conductive elastomer composition according to claim 1, wherein said thermoplastic elastomer composition (A) comprises a compound (A1) containing a styrene thermoplastic elastomer and/or an olefin resin as a main component thereof; and a compound (A2) dispersed in said compound (A1) by dynamically crosslinking said compound (A2) consisting of one or more rubber components selected from the group consisting of EPDM, butyl rubber, halogenated butyl rubber, acrylic rubber, BIMS which is a rubber formed by bromonating a copolymer of isobutylene and p-methylstyrene, fluoro rubber, and silicone rubber.

8. The conductive elastomer composition according to claim 7, wherein as said styrene thermoplastic elastomer, hydrogenated styrene thermoplastic elastomer is used.

9. The conductive elastomer composition according to claim 1, wherein said dynamic crosslinking is performed by using a resinous crosslinking agent.

10. The conductive elastomer composition according to claim 9, wherein said resinous crosslinking agent is selected from the group consisting of phenolic resin, melamine-formaldehyde resin, triazine-formaldehyde condensate and hexamethoxymethyl-melamine resin.

11. The conductive elastomer composition according to claim 9, wherein said resinous crosslinking agent is alkyiphenol-formaldehyde resin where the alkyl has 1–10 carbon atoms.

12. A conductive roller, for use in an electrophotographic apparatus, formed by the conductive elastomer composition according to claim 1.

13. The conductive roller according to claim 12, wherein said conductive roller is used as an antistatic paper-feeding roller having a compression set less than 30% when said compression set is measured at a temperature of 70° C. for 22 to 24 hours in a method specified in JIS K6262 and a Shore A hardness of not less than 10 nor more than 50 and a surface resistivity not more than $10^{11}$ ($\Omega$) when said surface resistivity is measured at an applied voltage of 1000V in a test method specified in JIS K6911.

14. The method of producing the conductive elastomer composition according to claim 1, wherein before said thermoplastic elastomer composition and said ionic-conductive agent are mixed with each other, said thermoplastic elastomer composition is dynamically crosslinked.

15. A conductive elastomer composition comprising a thermoplastic elastomer composition (A) containing a compound (A1) composed of a thermoplastic resin and/or a thermoplastic elastomer and a compound (A2), composed of a crosslinkable rubber and/or a crosslinkable thermoplastic elastomer, dispersed in said compound (A1) by dynamically crosslinking said compound (A2) by mixing with a crosslinking agent; and an ionic-conductive agent (B), containing a metal salt and a polyether-containing block copolymer resin, mixed with and dispersed in said thermoplastic elastomer composition (A).

16. The conductive elastomer composition according to claim 15, wherein said crosslinking agent is a resinous crosslinking agent.

17. The conductive elastomer composition according to claim 16, wherein said resinous crosslinking agent is selected from the group consisting of phenolic resin, melamine-formaldehyde resin, triazine-formaldehyde condensate and hexamethoxymethyl-melamine resin.

18. The conductive elastomer composition according to claim 16, wherein said resinous crosslinking agent is alkylphenol-formaldehyde resin where the alkyl has 1–10 carbon atoms.

\* \* \* \* \*